(12) United States Patent
Ebata

(10) Patent No.: US 8,639,217 B2
(45) Date of Patent: Jan. 28, 2014

(54) RADIO NETWORK MONITOR DEVICE AND MONITOR SYSTEM

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 337 days.

(21) Appl. No.: 10/588,456

(22) PCT Filed: Feb. 14, 2005

(86) PCT No.: PCT/JP2005/002175
§ 371 (c)(1),
(2), (4) Date: Aug. 4, 2006

(87) PCT Pub. No.: WO2005/079008
PCT Pub. Date: Aug. 25, 2005

(65) Prior Publication Data
US 2007/0165580 A1    Jul. 19, 2007

(30) Foreign Application Priority Data
Feb. 18, 2004   (JP) .................................. 2004-040898

(51) Int. Cl.
| H04J 3/24 | (2006.01) |
| H04L 12/28 | (2006.01) |
| H04M 1/66 | (2006.01) |
| H04W 4/00 | (2009.01) |
| H04W 40/00 | (2009.01) |
| H04M 3/00 | (2006.01) |
| H04M 7/00 | (2006.01) |
| G06F 15/173 | (2006.01) |

(52) U.S. Cl.
USPC ...... 455/410; 370/392; 370/395.31; 370/351; 370/338; 370/349; 455/411; 455/435.1; 455/445; 379/272; 379/221.14; 709/242

(58) Field of Classification Search
USPC ............ 370/349, 389, 338, 351, 392, 395.31; 455/426.1, 410–411, 414.1–414.2, 455/435.1–435.3, 445, 456.1–457, 455/560–561; 379/272, 221.14, 220.01; 709/238–244
See application file for complete search history.

(56) References Cited

U.S. PATENT DOCUMENTS 6,393,484 B1    5/2002  Massarani
7,362,742 B1 *  4/2008  Siddiqi et al. ................. 370/350
(Continued)

FOREIGN PATENT DOCUMENTS

CN    1430860 A    7/2003
JP    7-297852     11/1995
(Continued)

OTHER PUBLICATIONS

Cisco Systems Inc., Association Table, <http://ww2.hipri.com/cisco)pdf/pdfsearch/displayPDF/OL_0667_08/0657_08.PDF9-2>, 2 pgs.

Primary Examiner — Vladimir Magloire
Assistant Examiner — Michael Mapa
(74) Attorney, Agent, or Firm — Foley & Lardner LLP

(57) ABSTRACT

A system is connected to an access point via a network, receives packet transmission information held by the access point, and extracts an address having a transfer destination which is radio interface from the packet transmission information. It is assumed that the terminal of the extracted address exists under the access point holing the packet transmission information. Thus, it is possible to realize connection relationship between a terminal and an access point at low cost and not depending on the vendor.

26 Claims, 9 Drawing Sheets

(56) References Cited

U.S. PATENT DOCUMENTS

| | | |
|---|---|---|
| 2002/0032761 A1 | 3/2002 | Aoyagi et al. |
| 2003/0012202 A1* | 1/2003 | Fukutomi ................ 370/395.52 |
| 2003/0227914 A1 | 12/2003 | Nguyen |
| 2004/0177276 A1* | 9/2004 | MacKinnon et al. ......... 713/201 |
| 2004/0203372 A1 | 10/2004 | Morimoto |
| 2004/0230671 A1* | 11/2004 | Rollins et al. ................. 709/220 |
| 2005/0060576 A1* | 3/2005 | Kime et al. ................... 713/201 |

FOREIGN PATENT DOCUMENTS

| | | |
|---|---|---|
| JP | 8-32607 A | 2/1996 |
| JP | 8-154093 | 6/1996 |
| JP | 8-274782 | 10/1996 |
| JP | 8-274804 A | 10/1996 |
| JP | 2001-136172 A | 5/2001 |
| JP | 2002-051066 A | 2/2002 |
| JP | 2002-271392 A | 9/2002 |
| WO | WO 03/017582 A1 | 2/2003 |

* cited by examiner

FIG. 3

| AP | ENTRY | TERMINAL ADDRESS | TERMINAL ID | OPERATION SITUATION |
|---|---|---|---|---|
| AP 1 | ENTRY A | ADDRESS A | TERMINAL 1 | IN OPERATION |
| AP 2 | ENTRY C | ADDRESS B | TERMINAL 2 | IN OPERATION |
| AP 3 | ENTRY B | ADDRESS E | TERMINAL 5 | IN OPERATION |
| AP 3 | ENTRY C | ADDRESS Y | | NOT REGISTERED YET |

FIG. 5

| AP | SUBNET (AP) | VLAN-CORRESPONDENCE | ENTRY | TERMINAL ADDRESS | SUBNET (TERMINAL) | TERMINAL ID | OPERATION SITUATION |
|---|---|---|---|---|---|---|---|
| AP 1 | SUBNET 1 | ○ | ENTRY A | ADDRESS A | SUBNET 1 | TERMINAL 1 | IN OPERATION |
| AP 1 | SUBNET 1 | ○ | ENTRY C | ADDRESS B | SUBNET 2 | TERMINAL 2 | IN OPERATION |
| AP 2 | SUBNET 1 | × | ENTRY A | ADDRESS B | SUBNET 2 | TERMINAL 2 | IN OPERATION |
| AP 3 | SUBNET 2 | × | ENTRY A | ADDRESS B | SUBNET 2 | TERMINAL 2 | IN OPERATION |

FIG. 7

| AP | IDENTIFIER (AP) | ENTRY | TERMINAL ADDRESS | TERMINAL ID | OPERATION SITUATION |
|---|---|---|---|---|---|
| AP 1 | IDENTIFIER A | ENTRY A | ADDRESS A | TERMINAL 1 | IN OPERATION |
| AP 1 | IDENTIFIER A | ENTRY C | ADDRESS B | TERMINAL 2 | IN OPERATION |
| AP 2 | IDENTIFIER B | ENTRY A | ADDRESS B | TERMINAL 2 | IN OPERATION |
| AP 3 | IDENTIFIER C | ENTRY A | ADDRESS B | TERMINAL 2 | IN OPERATION |

TREE FORMAT 2

TABLE FORMAT

| AP 1 | TERMINAL 1 |
|---|---|
|  | TERMINAL 2 |
| AP 2 |  |
| AP 3 | TERMINAL 5 |

RADIO NETWORK MONITOR DEVICE AND MONITOR SYSTEM

APPLICABLE FIELD IN THE INDUSTRY

The present invention relates to a monitor apparatus, a monitor system, a monitor method, and a monitor program of a wireless network, and more particularly, to a monitor apparatus, a monitor system, a monitor method, and a monitor program of a wireless network for managing a terminal.

BACKGROUND ART

As a first prior art for grasping a connection situation of a terminal with an AP, there exists the function installed into an AP management tool attached to an AP product (For example, non-patent document 1). The above prior art provides the function that each AP collects information associated with the connection situation of the terminal, and supplies to the monitor apparatus connection information of the terminal in a unique format, which is text-displayed in a table format on a screen of the monitor apparatus (for example, a PC having a Web browser installed). The so-called uniquely format includes, for example, information uniquely specified by a vendor as MIB information (Management Information Base) of an SNMP (Simple Network Management Protocol), information uniquely specified by a vendor that is included in a HTTP (Hyper Text Transfer Protocol), a uniquely specified protocol, or the like. These formats, which are disclosed in some cases, are used only for its vendor's appliances.

As a second prior art, the technology that the monitor apparatus receives a broadcast packet of a wireless LAN, transmits a dummy packet to a transmission-source address of the same packet, and confirms its reply, thereby allowing a terminal-connection relation to be collected and to be displayed has been proposed (for example, patent document 1). In this technology, the apparatus for monitoring a connection relation is installed network by network.

Non-patent document 1: Cisco Systems Lnc., Association Table described in an Internet<http://www2.hipri.com/cisco_pdf/pdfsearch/displayPDF/OL_06_57_08/0657_08.PDF9-2>

Patent document 1: JP-P1995-297852A

DISCLOSURE OF THE INVENTION

Problems to be Solved by the Invention

In the first prior art, employing information peculiar to an access point (AP) vendor necessitates AP application of the methods by vendors or the methods by appliances in order that the monitor apparatus copes with a large number of the APs of the vendor, which gives rise to the problem that its system becomes complicated and the cost of the monitor apparatus becomes high, or the problem the monitorable system is limited to a system having the specific vendor appliance employed. Further, in a case of employing information of its own format that has not been disclosed, it is difficult to collect information because the above information cannot be utilized in the first place.

The second prior art typified by the patent document 1, which is capable of acquiring a connection relation of the terminal without depending upon the AP vendor, necessitates a configuration of the dedicated apparatus for directly transmitting/receiving the packet of the wireless LAN, which gives rise to the problem that the system becomes costly. Further, in order to collect information in a wide monitoring area, the above-mentioned dedicated transmission/reception apparatuses have to be installed into a large number of locations, which also gives rise to a high cost. Further, with the wireless LAN, the packet is sometimes exchanged even between the appliance companions each of which belongs to the network different from that of the other, whereby there also exists the problem that a connection relation cannot be grasped accurately.

Thereupon, the present invention has been accomplished in consideration of the above-mentioned problem, and an object thereof lies in solving the problem by providing a technology of realizing a function of grasping a connection relation between an AP and a terminal without necessitating information peculiar to an AP vendor and a large number of monitor apparatuses.

Means to Solve the Problem

The first invention for solving the above-mentioned problem, which is a monitor apparatus of a wireless network, is characterized in including: a means connected to an access point of the wireless network via a network, which receives packet transfer information that the access point retains, and extracts an address of which a transfer destination is a wireless interface from the packet transfer information; and an estimating means for estimating that the terminal having the extracted address exists as a subordinate of the access point retaining the packet transfer information.

The second invention for solving the above-mentioned problem, which is a monitor apparatus of a wireless network, is characterized in including: a means connected to an access point of the wireless network via a network, which receives packet transfer information that the access point retains, and extracts an address of which a transfer destination is a wireless interface from the packet transfer information; and a determining means for investigating an operation situation of the terminal having the extracted address to determine that the terminal having the address has a connection with the access point retaining the packet transfer information in a case where the terminal having the address is in operation.

The third invention for solving the above-mentioned problem is characterized in, in one of the above-mentioned first and second inventions, including: a managed terminal list having an address of a terminal, which is a target of management, registered; and a determining means for comparing the extracted address with an address described in the managed terminal list to determine that an access to the access point retaining the packet transfer information has been made by a terminal that is not a target of management in a case where the extracted address is not included in the managed terminal list.

The fourth invention for solving the above-mentioned problem is characterized in, in one of the above-mentioned first to third inventions, including a means for drawing a result on a relation between an access point and terminals, which are estimated to be existent as subordinates of the access point, or are determined to be in connection with the access point, for all the access points under management thereof to display an relation between each access point and each terminal that is estimated to be existent as a subordinate of each access point, or each terminal that is determined to be in connection with each access point.

The fifth invention for solving the above-mentioned problem is characterized in, in one of the above-mentioned first to fourth inventions, in a case where the address of the identical terminal has been described in the packet transfer information retained by plural access points, including: a means for, from among the packet transfer information, selecting the packet transfer information retained by the access point belonging to an identical subnet to that of the terminal, or the access point corresponding to a virtual LAN; and a means for, in a case where the selected packet transfer information retained by the access point belongs to the identical subnet to that of the terminal, and yet the number thereof is only one, estimating that the terminal exists as an subordinate of the one access point, or determines that the terminal has a connection with its access point, for, in a case where the access point belongs to the identical subnet to that of the terminal, and yet the number thereof is plural, estimating that the terminal exists as an subordinate of one of the plurality of the access points, or determining that the terminal has a connection with its access point, and for, in a case where all the access points do not belong to the identical subnet to that of the terminal, and yet each thereof is an access point corresponding to a virtual LAN, estimating that the terminal exists as an subordinate of one of the access points corresponding to the virtual LAN, or determining that the terminal has a connection with its access point.

The sixth invention for solving the above-mentioned problem is characterized in, in one of the above-mentioned first to fifth inventions, in a case where the address of the identical terminal has been described in the packet transfer information retained by plural access points, including: a means for, from the terminal, acquiring identification information of the wireless network to which the terminal belongs; a means for comparing identification information of the plural access points with the identification information acquired from the terminal; and a means for estimating that the terminal exists as a subordinate of the access point having the identification information identical to the identification information acquired from the terminal, or determining that the terminal has a connection with its access point.

The seventh invention for solving the above-mentioned problem, which is a monitor system of a wireless network that is configured of at least one access point of the wireless network, at least one terminal of the wireless network, and a monitor apparatus connected to the access point via a network, is characterized in that the monitor apparatus includes: a means for receiving packet transfer information of the access point to extract an address of which a transfer destination is a wireless interface from the packet transfer information; and an estimating means for estimating that the terminal having the extracted address exists as a subordinate of the access point retaining the packet transfer information.

The eighth invention for solving the above-mentioned problem, which is a monitor system of a wireless network that is configured of at least one access point of the wireless network, at least one terminal of the wireless network, and a monitor apparatus connected to the access point via a network, is characterized in that the monitor apparatus includes: a means for receiving packet transfer information of the access point to extract an address of which a transfer destination is a wireless interface from the packet transfer information; and a determining means for investigating an operation situation of the terminal having the extracted address to determine that the terminal having the address has a connection with the access point retaining the packet transfer information in a case where the terminal having the address is in operation.

The ninth invention for solving the above-mentioned problem, is characterized in that, in one of the above-mentioned seventh and eighth inventions, the monitor apparatus includes: a managed terminal list having an address of a terminal, which is a target of management, registered; and a determining means for comparing the extracted address with an address described in the managed terminal list to determine that an access to the access point retaining the packet transfer information has been made by a terminal that is not a target of management in a case where the extracted address is not included in the managed terminal list.

The tenth invention for solving the above-mentioned problem is characterized in that, in one of the above-mentioned seventh to ninth inventions, the monitor apparatus includes a means for drawing a result on a relation between an access point and terminals, which are estimated to be existent as subordinates thereof, or are determined to be in connection with the access point, for all the access points under management thereof to display a relation between each access point and each terminal that is estimated to be existent as a subordinate of each access point, or each terminal that is determined to be in connection with each access point.

The eleventh invention for solving the above-mentioned problem is characterized in that, in one of the above-mentioned seventh to tenth inventions, in a case where the address of the identical terminal has been described in the packet transfer information retained by plural access points, the monitor apparatus includes: a means for, from among the packet transfer information, selecting the packet transfer information retained by the access point belonging to an identical subnet to that of the terminal, or the access point corresponding to a virtual LAN; and a means for, in a case where the selected packet transfer information retained by the access point belongs to the identical subnet to that of the terminal, and yet the number thereof is only one, estimating that the terminal exists as an subordinate of the one access point, or determining that the terminal has a connection with its access point, for, in a case where the access point belongs to the identical subnet to that of the terminal, and yet the number thereof is plural, estimating that the terminal exists as an subordinate of one of the plurality of the access points, or determining that the terminal has a connection with its access point, and for, in a case where all the access points do not belong to the identical subnet to that of the terminal, and yet each thereof is an access point corresponding to a virtual LAN, estimating that the terminal exists as an subordinate of one of the access points corresponding to the virtual LAN, or determining that the terminal has a connection with its access point.

The twelfth invention for solving the above-mentioned problem is characterized in that, in one of the above-mentioned seventh to eleventh inventions, in a case where the address of the identical terminal has been described in the packet transfer information retained by plural access points, the monitor apparatus includes: a means for, from the terminal, acquiring identification information of the wireless network to which the terminal belongs; a means for comparing identification information of the plural access points with the identification information acquired from the terminal; and a means for estimating that the terminal exists as a subordinate of the access point having identification information identical to the identification information acquired from the terminal, or determining that the terminal has a connection with its access point.

The thirteenth invention for solving the above-mentioned problem is characterized in that, in one of the above-mentioned seventh to twelfth inventions; the terminal includes a means for transmitting a broadcast packet; and the access point includes a means for updating the packet transfer information that the access point retains based upon the broadcast packet.

The fourteenth invention for solving the above-mentioned problem is characterized in, in one of the above-mentioned seventh to thirteenth inventions, the access point includes: a means for notifying to the other access point information as to which access point to which the terminal belongs; and a means for updating the packet transfer information that the access point retains based upon the information as to which access point to which the terminal belongs.

The fifteenth invention for solving the above-mentioned problem, which is a control program of an information processing apparatus that is connected to an access point of a wireless network via a network, and employed as a monitor apparatus, is characterized in that the control program causes the information processing apparatus to function as: a means for receiving packet transfer information of the access point to extract an address of which a transfer destination is a wireless interface from the packet transfer information; and an estimating means for estimating that the terminal having the extracted address exists as a subordinate of the access point retaining the packet transfer information.

The sixteenth invention for solving the above-mentioned problem, which is a control program of an information processing apparatus that is connected to an access point of a wireless network via a network, and employed as a monitor apparatus, is characterized in that the control program causes the information processing apparatus to function as: a means for receiving packet transfer information of the access point to extract an address of which a transfer destination is a wireless interface from the packet transfer information; and a determining means for investigating an operation situation of the terminal having the extracted address to determines that the terminal having the address has a connection with the access point retaining the packet transfer information in a case where the terminal having the address is in operation.

The seventeenth invention for solving the above-mentioned problem is characterized in that, in one of the above-mentioned fifteenth and sixteenth inventions, the control program causes the information processing apparatus to function as a determining means for comparing the extracted address with an address described in a managed terminal list having an address of a terminal, which is a target of management, registered to determine that an access to the access point having the packet transfer information has been made by a terminal that is not a target of management in a case where the extracted address is not included in the managed terminal list.

The eighteenth invention for solving the above-mentioned problem is characterized in that, in one of the above-mentioned fifteenth to seventeenth inventions, the control program causes the information processing apparatus to function as a means for drawing a result on a relation between an access point and terminals, which are estimated to be existent as subordinates of the access point, or are determined to be in connection with the access point, for all access points under management thereof to display a relation between each access point and each terminal that is estimated to be existent as a subordinate of each access point, or each terminal that is determined to be in connection with each access point.

The nineteenth invention for solving the above-mentioned problem is characterized in that, in one of the above-mentioned fifteenth to eighteenth inventions, in a case where the address of the identical terminal has been described in the packet transfer information retained by plural access points, the control program causes the information processing apparatus to function as: a means for, from among the packet transfer information, selecting the packet transfer information retained by the access point belonging to the identical subnet to that of the terminal, or the access point corresponding to a virtual LAN; and a means for, in a case where the selected packet transfer information retained by the access point belongs to the identical subnet to that of the terminal, and yet the number thereof is only one, estimating that the terminal exists as an subordinate of the one access point, or determining that the terminal has a connection with its access point, for, in a case where the access point belongs to the identical subnet to that of the terminal, and yet the number thereof is plural, estimating that the terminal exists as an subordinate of one of the plurality of the access points, or determining that the terminal has a connection with its access point, and for, in a case where all the access points do not belong to the identical subnet to that of the terminal, and yet each thereof is an access point corresponding to a virtual LAN, estimating that the terminal exists as an subordinate of one of the access points corresponding to the virtual LAN, or determining that the terminal has a connection with its access point.

The twentieth invention for solving the above-mentioned problem is characterized in that, in one of the above-mentioned fifteenth to nineteenth inventions, in a case where the address of the identical terminal has been described in the packet transfer information retained by plural access points, the control program causes the information processing apparatus to function as: a means for, from the terminal, acquiring identification information of the wireless network to which the terminal belongs; a means for comparing identification information of the plural access points with the identification information acquired from the terminal; and a means for estimating that the terminal exists as a subordinate of the access point having identification information identical to the identification information acquired from the terminal, or determining that the terminal has a connection with its access point.

The twenty-first invention for solving the above-mentioned problem, which is a monitor method of a wireless network for managing a terminal, is characterized in including the steps of: extracting an address of which a transfer destination is a wireless interface from packet transfer information that an access point of the wireless network retains; and estimating that the terminal having the extracted address exists as a subordinate of the access point retaining the packet transfer information.

The twenty-second invention for solving the above-mentioned problem, which is a monitor method of a wireless network for managing a terminal, is characterized in including the steps of: extracting an address of which a transfer destination is a wireless interface from packet transfer information that an access point of the wireless network retains; and investigating an operation situation of the terminal having the extracted address to determine that the terminal having the address has a connection with the access point retaining the packet transfer information in a case where the terminal having the address is in operation.

The twenty-third invention for solving the above-mentioned problem is characterized in, in one of the above-mentioned twenty-first and twenty-second inventions, including a step of comparing the extracted address with an address described in a managed terminal list having an address of a terminal, which is a target of management, registered to determine that an access to the access point having the packet transfer information has been made by a terminal that is not a target of management in a case where the extracted address is not included in the managed terminal list.

The twenty-fourth invention for solving the above-mentioned problem, is characterized in, in one of the above-mentioned twenty-first to twenty-third inventions, including a step of drawing a result on a relation between an access point and terminals, which are estimated to be existent as subordinates of the access point, or are determined to be in connection with the access point, for all access points under management thereof to display an relation between each access point and each terminal that is estimated to be existent as a subordinate of each access point, or each terminal that is determined to be in connection with each access point.

The twenty-fifth invention for solving the above-mentioned problem, is characterized in, in one of the above-mentioned twenty-first to twenty-fourth inventions, in a case where the address of the identical terminal has been described in the packet transfer information retained by plural access points, including: a step of: from among the packet transfer information, selecting the packet transfer information retained by the access point belonging to the identical subnet to that of the terminal, or the access point corresponding to a virtual LAN; and a step of, in a case where the selected packet transfer information retained by the access point belongs to the identical subnet to that of the terminal, and yet the number thereof is only one, estimating that the terminal exists as an subordinate of the one access point, or determining that the terminal has a connection with its access point, of, in a case where the access point belongs to the identical subnet to that of the terminal, and yet the number thereof is plural, estimating that the terminal exists as an subordinate of one of the plurality of the access points, or determining that the terminal has a connection with its access point, and of, in a case where all the access points do not belong to the identical subnet to that of the terminal, and yet each thereof is an access point corresponding to a virtual LAN, estimating that the terminal exists as an subordinate of one of the access points corresponding to the virtual LAN, or determining that the terminal has a connection with its access point.

The twenty-sixth invention for solving the above-mentioned problem, is characterized in, in one of the above-mentioned twenty-first to twenty-fifth inventions, in a case where the address of the identical terminal has been described in the packet transfer information retained by plural access points, including: a step of, from the terminal, acquiring identification information of the wireless network to which the terminal belongs; a step of comparing identification information of the plural access points with the identification information acquired from the terminal; and a step of estimating that the terminal exists as a subordinate of the access point having the identification information identical to the identification information acquired from the terminal, or determining that the terminal has a connection with its access point.

An operation of the present invention will be described. The present invention is for, based upon wireless interface information to be included in the packet transfer information that the access point has, extracting an address of the terminal that is connected via the wireless interface to estimate that the terminal having this address exists a subordinate of the access point. In such a manner, the packet transfer information that a general access point has is employed to estimate the terminal, being a subordinate of the access point, thereby making it possible to estimate existence of the terminal, being a subordinate of the access point, without depending upon a vendor.

Further, in the present invention, confirming the operation situation of the above-mentioned terminal of which existence has been estimated enables a connection relation between the access point and the terminal to be determined.

Effects of the Invention

The present invention exhibits an excellent effect that, in the monitor apparatus, the address of which the transfer destination is a wireless interface is extracted from the transfer information that the access point retains for a purpose of transferring and it is estimated that the terminal having this extracted address exists as a subordinate of the access point retaining the packet transfer information, whereby a connection relation between the AP and the terminal of the wireless LAN can be grasped without depending upon the vendor and further without necessitating a large of the monitor apparatuses, Further, the present invention does not necessitate installation of a plurality of the apparatuses because information of all APs under management can be collected by one apparatus network-connected to the above AP.

Further, grasping a connection relation between the AP and the terminal allows the effect that the wireless LAN can be operated/managed smoothly to be obtained.

Yet further, the effect that it becomes possible to appropriately take a load distribution control is obtained because the precision at which the load to each AP is estimated is enhanced.

Yet further, by detecting the terminal that is not an object of registration, the effect that an unjust access can be detected is obtained.

BRIEF DESCRIPTION OF THE DRAWINGS

FIG. 3 is a view illustrating an example of information to be recorded in a recorder 1013, which is used in the embodiment 1 and the embodiment 2 of the present invention.

FIG. 5 is a view illustrating an example of information to be recorded in the recorder 1013, which is used in the embodiment 3 of the present invention.

FIG. 7 is a view illustrating an example of information to be recorded in the recorder 1013, which is used in the embodiment 3 of the present invention.

DESCRIPTION OF NUMERALS

Figure 1:
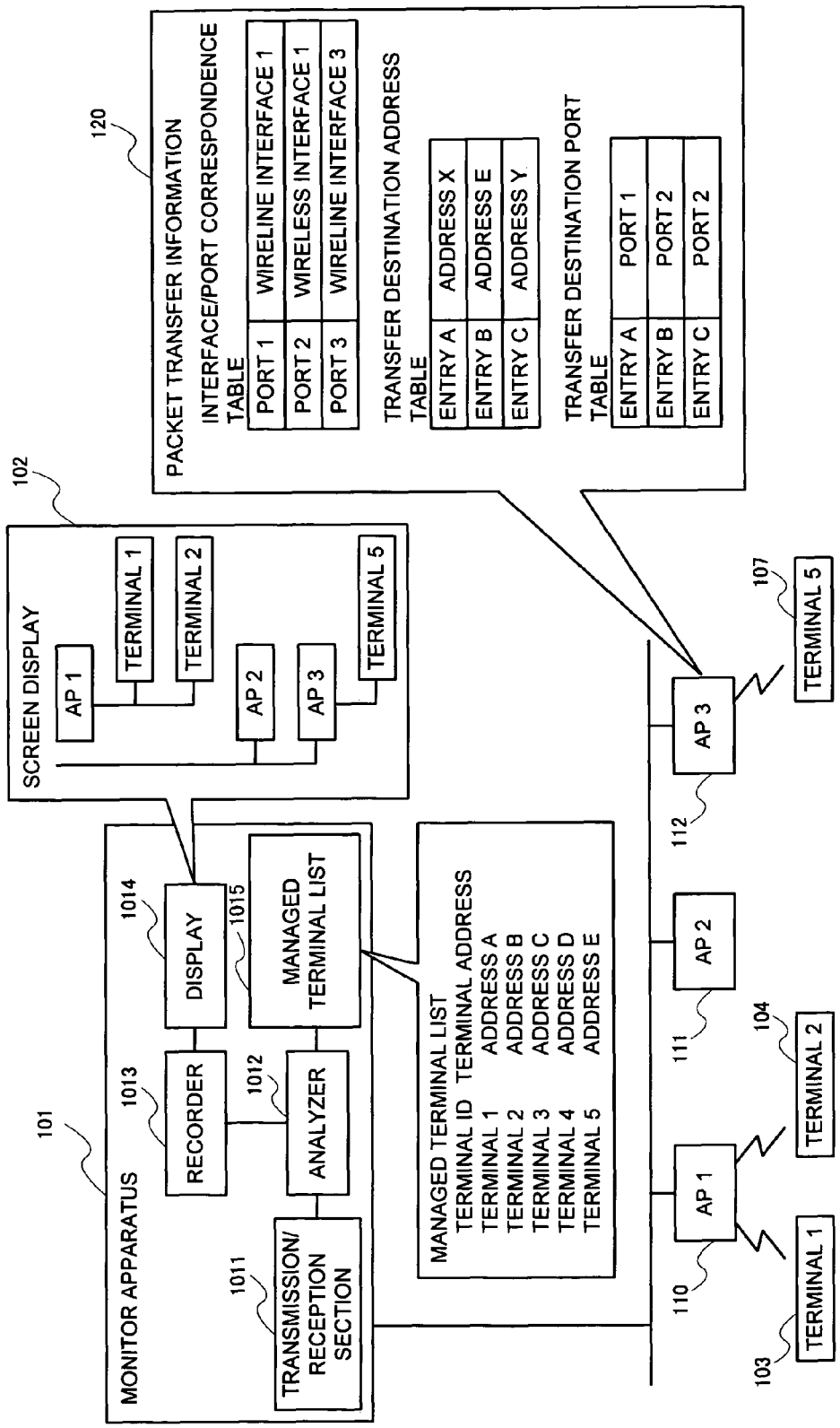
FIG. 1 is a configuration view illustrating a configuration of an embodiment 1 and an embodiment 2 of the present invention.

101 monitor apparatus
103 to 107 wireless LAN terminals
110 to 112 wireless LAN access points (APs)
1011 transmission/reception section
1012 analyzer
1013 recorder
1014 display
1015 managed terminal list

BEST MODE FOR CARRYING OUT THE INVENTION

In the present invention, a monitor apparatus (equivalent to 101 of FIG. 1) connected to the access point of the wireless network via a network extracts the address of the terminal that is connected via a wireless interface based upon wireless interface information to be included in packet transfer information (equivalent to 120 of FIG. 1) that the access point has, and estimates that the address having this address exists as a subordinate of the access point Further, by investigating the operation situation of the terminal that is estimated to be existent as a subordinate of the access point with the above-mentioned technique, it is determined that the above terminal has a connection with its access point. As one example of the method of investigating this operation situation, there exists the method of confirming a response of an ICMP packet (in general, a ping command). This confirmation can be made in an analyzer 1012 and a transmission/reception section 1011 of FIG. 1.

Additionally, the present invention enables information associated with the packet transfer of the access point, which is, as a rule, information that is retained irrespectively of an apparatus vendor, to be processed without depending upon the vendor.

Further, the present invention is configured so that the monitor apparatus, which is provided with a managed terminal list (equivalent to 1015 of FIG. 1) having the address of the terminal, which is a target of management, pre-registered, compares the above-mentioned extracted address with the address described in the managed terminal list to monitor an access to the access point retaining the packet transfer information by the terminal that is not a target of management, i.e. an unjust access in a case where the extracted address is not included in the managed terminal list.

Further, the present invention is configured so as to draw a conclusion on a relation with the terminal, which is estimated to be existent as a subordinate of each access point, or the terminal, which is determined to be in connection with each access point, for all the access points under management and to display these relations.

Further, the present invention is configured so that, in a case where the address of the identical terminal has been described in a plurality of access points having the packet transfer information, the access point that does not belong to the identical subnet to that of the terminal, out of a plurality of the access points, is excluded, and in a case where the number of the access point belonging to the identical subnet to that of the terminal becomes one (1) as a result of exclusion, it is estimated that the terminal exists as a subordinate of one access point, or it is determined that the terminal has a connection with its access point.

Yet further, as another technique in the case that the address of the identical terminal has been described in a plurality of access points having the packet transfer information, a configuration is made so that the identification information of the wireless network to which the terminal belongs is acquired from the terminal, this identification information is compared with the identification information of a plurality of the access points, and thereby, it is estimated that the terminal exists as a subordinate of the access point having the identical identification information to the identification information acquired from the terminal, or it is determined that the terminal has a connection with its access point.

Hereinafter, specific embodiments will be explained.

EMBODIMENT 1

An embodiment 1 of the present invention will be explained in details based upon the accompanied drawings.

FIG. 1 illustrates an example of the monitor system of the wireless LAN by the monitor apparatus of the present invention.

The monitor system of the wireless LAN in the embodiment 1 of the present invention is configured of one wireless LAN access point (AP) or more 110 to 112 having the packet transfer information, wireless LAN terminals 103 to 107 of which the number is zero, or at least one, and a monitor apparatus 101 connected the AP via a network. Additionally, the monitor apparatus 101 may be an independent apparatus, and may be installed within the access point (AP) or the terminal, or within a switch of Layer 2 or Layer 3 connected to the access point (AP).

The packet transfer information that the access point retains is, for example, packet transfer information 120 as shown in FIG. 1. In this figure, the packet transfer information that an AP 3 has is shown, in which a correspondence table of an interface and a port, a transfer destination address table, and a transfer destination port table are kept. This information, which is information that a bridge or a router retains normally, is generally kept in the AP as well. The packet transfer information can be acquired by employing the SNMP.

The monitor apparatus 101 is configured of a transmission/reception section 1011 for making communication with the AP, a analyzer 1012 for analyzing information received from the AP, a managed terminal list 1015 for retaining a list of the terminal, being a target of management, a recorder 1013 for retaining a connection relation between the derived AP and the terminal, and a display 1014 for displaying a connection relation between the AP and the terminal. Additionally, it is acceptable that the display 1014 is not integrated into the monitor apparatus 101, but may be mounted over a network, thereby allowing the connection relation to be displayed with the network connection.

An operation of the embodiment 1 of the present invention will be explained by employing FIG. 1 and FIG. 2 having the process-flow shown.

The monitor apparatus 101 grasps a connection relation with the terminal for each AP under management thereof, and displays its result in the display 1014. For this end, the monitor apparatus 101 performs a process for grasping a connection relation with the terminal one AP by one AP (steps S1 to S11). Herein, an explanation will be made along the example of grasping a connection relation with the terminal of the AP 3 of FIG. 1 as a specific example.

In the step S2, the analyzer 1012 and the transmission/reception section 1011 of the monitor apparatus 101 grasp an interface number (for example, an ifindex value in the MIB information of the SNMP) assigned to the wireless LAN interface of the above AP. In the product of the AP, the ifindex value in the MIB information, which is a fixed value as a rule, may be defined in advance according to the kind of the AP, and information of all the interface numbers provided may be acquired and judged by employing the SNMP etc.

In the step S3, the transmission/reception section 1011 of the monitor apparatus 101 acquires interface/port correspondence information out of information associated with the packet transfer from the AP, and supplies it to the analyzer 1012. The relation of the interface number vs. the port number is a relation of 1 vs. 1 or 1 vs. many. This information makes it possible to judge which port number is equivalent to the wireless LAN interface. In an example of the AP3, it is seen from the correspondence table of the interface and the port number that a wireless LAN interface 1 has been assigned to a port 2.

In the step S4, the transmission/reception section 1011 of the monitor apparatus 101 receives the transfer destination port table and the transfer destination address table of the AP out of information associated with the packet transfer from the AP, and delivers them to the analyzer 1012.

The analyzer 1012 extracts an entry of which the transfer destination port is the port of the wireless LAN interface, and records the transfer destination address of the identical entry as a terminal address in the recorder 1013. FIG. 3 shows an example of information that is recorded in the recorder 1013. At this time point, the corresponding AP, the extracted entry, and the address corresponding to its entry are described. In an example of the AP3, the wireless LAN interface is the port 2, which corresponds to an entry B and an entry C, by making a reference to the transfer destination port table, and it is seen from the transfer destination address table that the transfer destination address of these entries are an address E and an address Y respectively. In the recorder 1013, as shown in FIG. 3, the address E and the address Y are described as the entry B of the AP3 and the entry C of the AP 3, respectively. Utilizing the packet transfer information that the AP retains in such a manner makes it possible to recognize the address of the terminal connected to the wireless LAN interface without depending upon the vendor, and to recognize the address of the terminal that is estimated to be existent as a subordinate of the access point (in this example, it can be estimated that the terminal having the address E and the terminal having the address Y exist as a subordinated of the AP3 respectively). Further, the record that the packet passed is left in the transfer information of the AP regardless of success or failure in authentication for making a connection with the wireless LAN by the terminal, whereby information associated with the terminal that has not succeeded in authentication also can be acquired.

EMBODIMENT 2

In the embodiment 2, the operation proceeds to a point of determining whether or not the terminal estimated to be existent as a subordinate of the access point with the technique described in the embodiment 1 has a connection with its access point.

Figure 2:
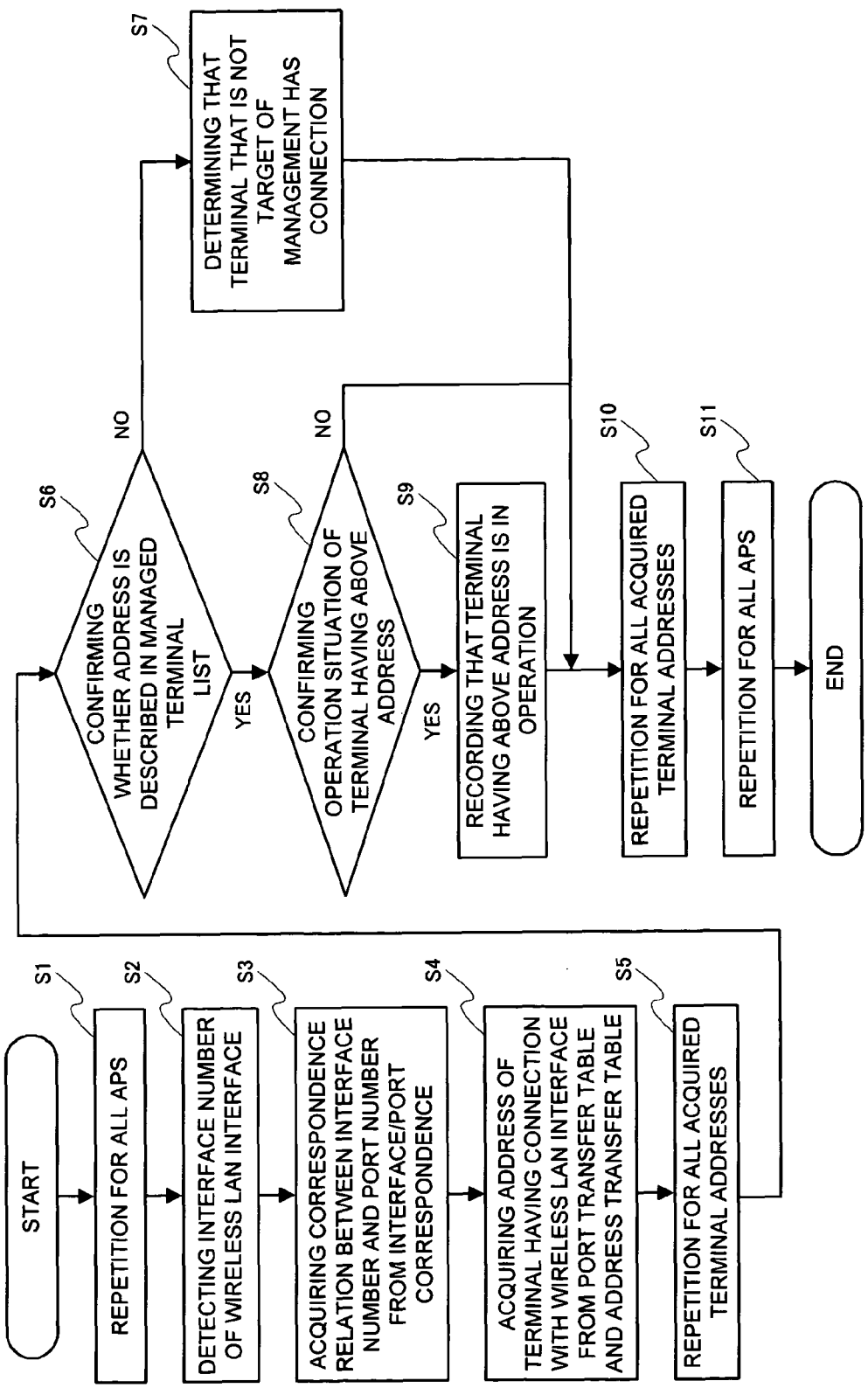
FIG. 2 is a process flowchart in the embodiment 1 and the embodiment 2 of the present invention.

In the network configuration of FIG. 1, the operation of the embodiment 2 is identical to that of the embodiment 1 until the point of estimating the terminal that exits as a subordinate of the access point in the steps S1 to S4 of FIG. 2.

In the embodiment 2, thereafter, the steps S5 to S10 of FIG. 2 are taken for each recorded transfer destination address. The address of the terminal that is a target of management is pre-registered into the managed terminal list 1015. As an example of the address to be included in the managed terminal list 1015, there exists an MAC address or an IP address.

In the step S6, the analyzer 1012 confirms whether the terminal address recorded in the recorder 1013 is described in the list of the address of the registered terminal. In a case where there is no description about it in the list, it is judged that the terminal that is not a target of management has accessed the above AP (step S7). Upon assuming that the terminal having the above address has made an unjust access, accompanied by this judgment, a warning may be issued. In an example of the AP3, there is no description of the address Y, being one of the addresses acquired in the step S4, in the managed terminal list, so the terminal having the above address is regarded as a terminal that is not a target of management.

In a case of the terminal address of which description exists in the list, the operation proceeds to the step S8, where the operation situation of the terminal having the above address is investigated. The reason is that there is the possibility that the terminal, which has already stopped the operation as a matter of fact, exists even though there is the description in the table of the AP.

As a method of investigating the operation situation, there exists the method that the analyzer 1012 of the monitor apparatus 101 transmits the ICMP packet (in general, ping command) via the transmission/reception section 1011 to confirm its response. In a case where it has been judged that the terminal is not operating, the effect that the appliance having the above transfer destination address is in non-operation is recorded in the recorder 1013. In a case where it has been judged that the terminal is operating, the effect that it is in operation is recorded in the recorder 1013. As a result of this, it can be determined that the terminal of which the operation recorded in the recorder 1013 has been confirmed has a connection with the AP described in the above record.

In an example of the AP3, the process for confirming the operation situation for the address E is performed, and when the operation is confirmed, it can be judged that the terminal having the address E, i.e. a terminal 5 has a connection with the AP3. These processes are performed repeatedly for each recorded transfer destination address and for each AP, thereby to extract the address of the terminal, and to record the operation situation of the terminal.

Additionally, in a case where the packet transfer information of the AP has not been updated appropriately, information such that the identical terminal belongs to the different APs simultaneously is sometimes recorded in the recorder 1013. That is, in some cases, it follows that the identical terminal is recorded repeatedly in both of the AP to which it belonged previously and the AP to which it belongs currently. Even in this case, when the terminal transmits the broadcast packet via the AP to which the terminal newly belongs, and the AP to which the terminal previously belonged receives the packet of the above terminal from the port in the wire side, the packet transfer information is updated, and the repeated record disappears. As a typical example of the broadcast packet is listed the ARP (Address Resolution Protocol, being a protocol to be employed for taking the correspondence between the physical address and the IP address) packet that is transmitted prior to communication.

Further, employing the AP having the function installed such that the AP notifies information of the terminal, which has newly made a connection, to the other AP also makes it possible to update the packet transfer information (for example, the function of employing the Inter Access Point Protocol in the IEEE standard 802.11, thereby to notify a travel of the terminal).

In such a manner, a connection relation between the terminal, of which the operation has been confirmed, and a specific AP is recorded in the recorder 1013.

Figures 8, 9:
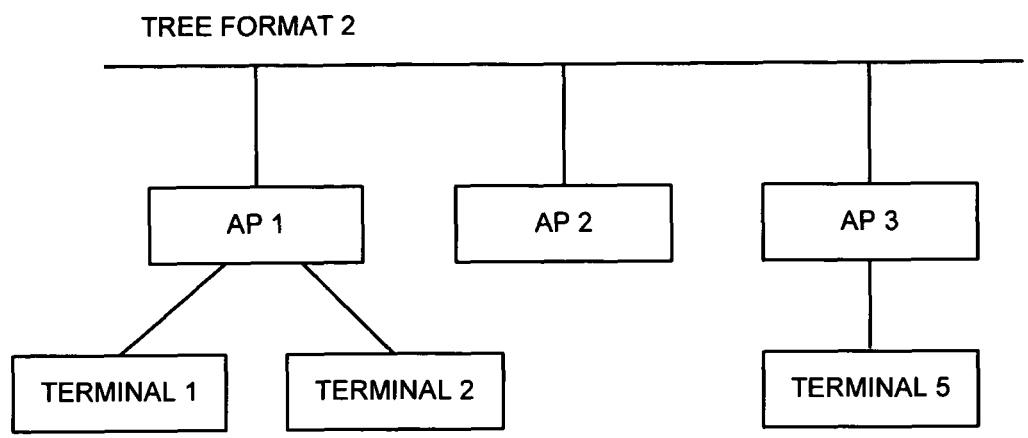
FIG. 8 is a view illustrating an example of a display format in the embodiment of the present invention.
FIG. 9 is a view illustrating an example of a display format in the embodiment of the present invention.

With a relation between the terminal, which is in operation according to the recorder 1013, and the AP described in its line, the display 1014 displays the terminals having a connection with the AP in a tree shape AP by AP, as shown in the screen display 102 of FIG. 1. Displaying a plurality of the APs under management and the terminals as a subordinate thereof simultaneously in a tree shape enables an administrator of the wireless LAN to easily recognize a connection relation between the AP and the terminal. Additionally, as a display format to be used in displaying a connection relation between the AP and the terminal, in addition to the example shown in the screen display 102 of FIG. 1, a tree format shown in FIG. 8, a table format shown in FIG. 9, etc. may be adopted.

As mentioned above, the present invention allows the packet transfer information of all the APs under management to be collected from one monitor apparatus, and the terminal having a connection with the AP to be derived in each AP by employing the general-purpose protocol such as the SNMP.

Further, in accordance with the present invention, the so-called apparatus can be configured of only one general-purpose network appliance, thereby enabling a low cost.

EMBODIMENT 3

The embodiment 3 of the present invention will be explained.

Figure 4:
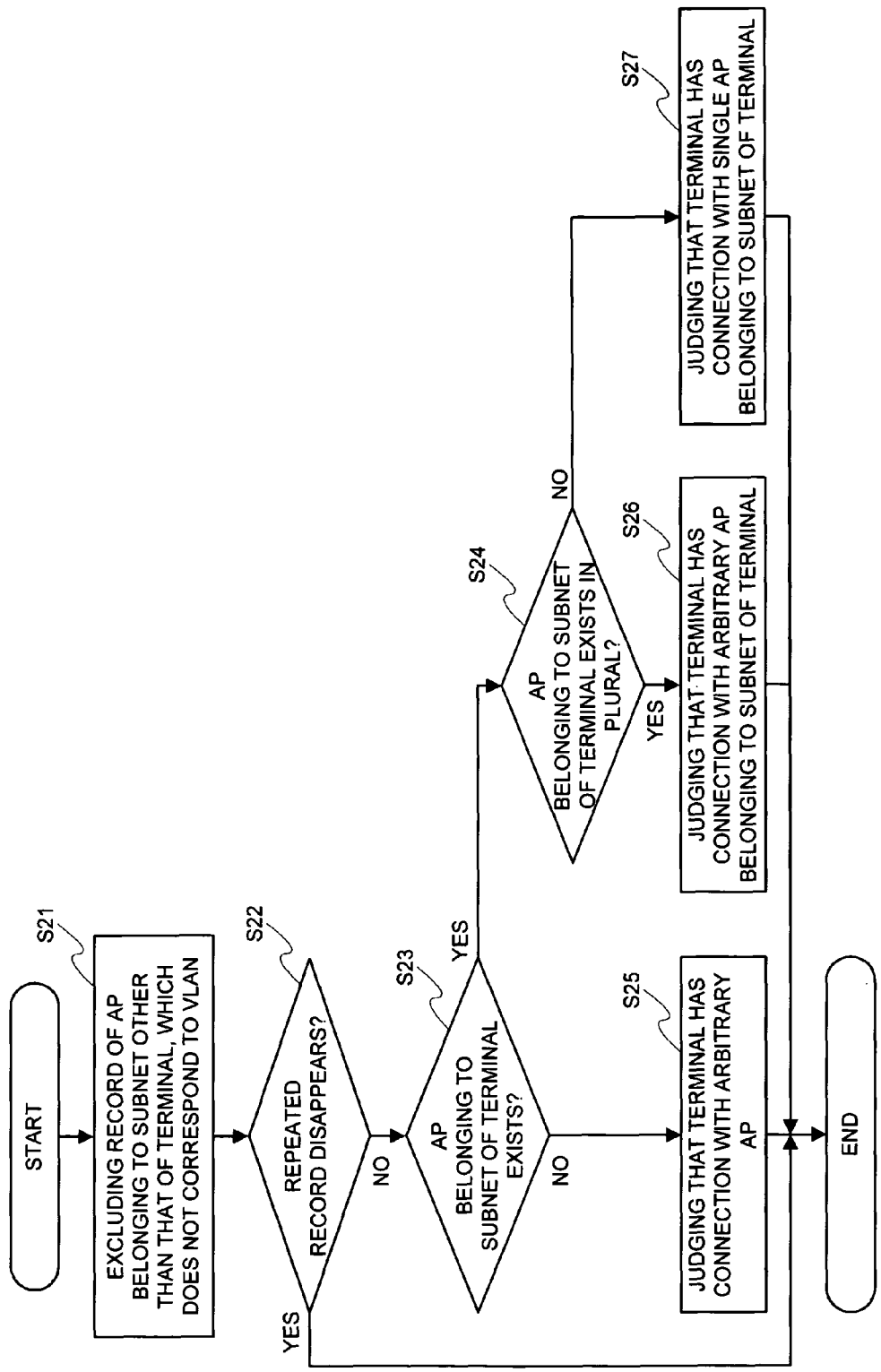
FIG. 4 is a process flowchart of making a selection by a subnet to which the terminal belongs in a case where the record of the terminal has been repeated in an embodiment 3 of the present invention.
Figure 6:
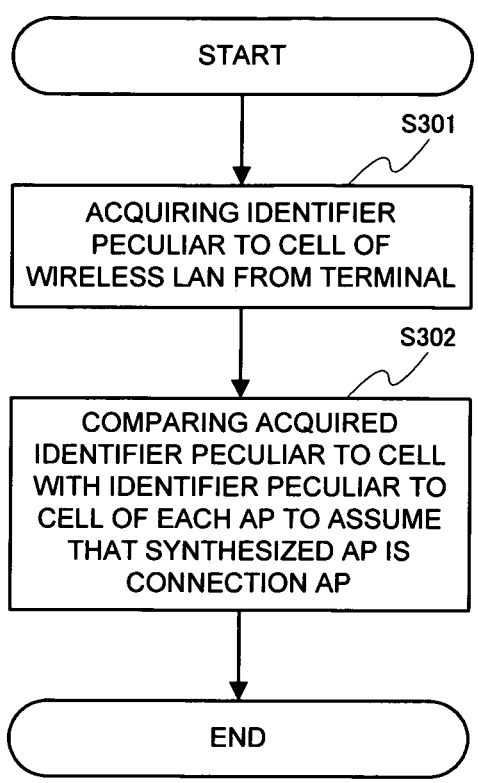
FIG. 6 is a process flowchart of making a selection by an AP group identifier that is acquired from the terminal in a case where the record of the terminal has been repeated in the embodiment 3 of the present invention.

In the embodiment 1, there is the case that the terminal address recorded in the recorder 1013 is repeated. That is, in some cases, information such that one terminal has a connection with a plurality of the APs simultaneously has been recorded in the recorder 1013. This might take place due to a delay in updating the packet transfer information by the AP, or to making a connection with the different subnet by the terminal. The so-called subnet signifies a unit of management of the network. In the IP network, the high-ranked bit number to be specified by a subnet mask out of the IP address signifies an address (network address) of the subnet. So as to modify such a repetition of the records, the process flow as shown in FIG. 4 or FIG. 6 may be added after the step S11.

At first, a modification method in the case that the identical terminal has been recorded in plural will be explained based upon FIG. 4.

This process is executable in a case where the IP address of the AP and the terminal is ascertained, and a plurality of the records exist because the terminal made a connection to the AP of the different subnet. Further, it is assumed that there exist the subnets to which the AP and the terminal belong respectively, and the subnet of each AP and the subnet of each terminal are pre-registered within the monitor apparatus 101. In this embodiment, it is assumed that the terminal succeeds in authentication for making a connection with only the AP that belongs to the subnet identical to its own subnet or corresponds to a virtual LAN (also described as a VLAN), and yet has the function of virtually making a connection with the terminal's own subnet, and comes into a communicatable state. With the AP corresponding to the VLAN, it is assumed that information as to which subnet with which the above AP can make a virtual connection can be grasped in advance.

In a step S21, for the terminal, which has a connection with a plurality of APs according to the record, the record of connection with the AP belonging to the subnet other than that of the above terminal, and the record of the connection with the AP that does not correspond to the VLAN connectable to the subnet of the terminal are deleted.

In an example of FIG. 5, it has been recorded that a terminal 2 having the address B, which belongs to the subnet 2, has a connection with three APs; however the subnet of the AP2 is the subnet 1, which differs from the subnet 2 of the terminal 2, so a line of the AP2 to the terminal 2 is deleted. The AP1, of which the subnet is the subnet 1, is not deleted because it corresponds to the VLAN.

In a case where the repeated record disappears by deleting the record associated with the AP belonging to the different subnet, it can be judged that the AP of which the record have been left is a connection AP of the above terminal, so the process is finished (step S22).

In a case where the repeated record still exists, it is confirmed whether, out of the recorded APs, the AP belonging to the subnet identical to that of the terminal exists in (step S23). In a case where no AP belonging to the identical subnet exists, that is, all the APs having plural records are an AP corresponding to the VLAN respectively, the AP is difficult to specify more elaborately than this, so the process is finished, or upon assuming that the terminal has a connection with an arbitrary AP out of the APs having plural records, the other record is deleted, and the process is finished (step S25).

In a case where the AP belonging to the subnet identical to that of the terminal exists in the step S23, the operation proceeds to the step S24, in which it is confirmed whether the AP belonging to the subnet identical to that of the terminal exists in plural.

In a case where only one AP belonging to the subnet identical to that of the terminal exists, it is judged that the above terminal has a connection with the above AP, and a line of the other AP, with which the above terminal have a connection according to the record, is deleted (step S27). In a case where the AP belonging to the subnet identical to that of the terminal exists in plural in the step S24, the AP is difficult to specify more elaborately than this, so the process is finished, or upon assuming that the terminal has a connection to an arbitrary AP out of the APs having plural records, which belong to the identical subnet, the other record is deleted, and the process is finished (step S26).

In an example of FIG. 5, the AP3 belongs to the subnet 2 identical to that of the terminal 2, and the AP1 is an AP corresponding to the VLAN, so it is determined that the terminal 2 belongs to the AP3.

As mentioned above, in a case where the identical terminal has a connection in a plurality of the access points according to the record, judging in a priority manner that the access point belonging to the subnet identical to that of the above terminal is a connection destination makes it possible to exclude the result that the identical terminal belongs to a plurality of the access points, which is contradictory. The reason is that the terminal can succeed in authentication for making a connection with only the AP that belongs to the subnet identical to its own subnet, or corresponds to a virtual LAN (also describes as a VLAN), and yet includes the function of virtually making a connection with the terminal's own subnet, and come into a communicatable state, and it can be supposed that the connection record in the different subnet was described at the moment that the terminal failed in the connection authentication. In a case where the terminal failed in the connection authentication, this matter is left in the record of the packet transfer in some cases; however the above terminal has no connection with the above AP because of a failure in the connection authentication.

Next, a second modification method in the case that the identical terminal has been recorded in plural will be explained based upon FIG. 6.

This process is executable in a case where information associated with the wireless LAN with which the terminal is in connection can be acquired from the terminal. In the wireless LAN, a unique identifier (hereinafter, referred to as an AP group identifier) is used for each group that is configured of one AP and a terminal having a connection with its AP. In the IEEE standard 802.11, its group is defined as a BSS (Basic Service Set), and its identifier as a BSSID (Basic Service Set Identification).

In a step S301, the monitor apparatus 101 acquires this AP group identifier from the terminal, which has a connection with a plurality of the APs according to the record, by employing the transmission/reception section 1011. The monitor apparatus 101 grasps the AP group identifier of each AP in advance, or acquires and records it from each AP by employing the transmission/reception section 1011.

FIG. 7 shows an example having AP group identifiers by APs recorded. And, the acquired AP group identifier of the terminal is compared with the AP group identifier of a plurality of the APs with which the above terminal has a connection according to the record. The record of the AP of which the AP group identifier differs from that of the terminal is all deleted.

As a result, it is determined that the AP of which the AP group identifier is identical is the AP with which the above terminal has a connection. For example, in a situation of having been recorded as show in FIG. 7, upon assuming that the AP group identifier acquired from the terminal 2 is an identifier C, the entries of the APs except the AP3 having the identical identifier C, out of the APs having the above terminal recorded are deleted. As a result, it can be judged that the terminal 2 has a connection with the AP3.

As mentioned above, in a case where the identical terminal has a connection in a plurality of the access points according to the record, acquiring the identification information (the AP group identifier) of the wireless LAN from the above terminal to compare it with the identification information of the access point makes it possible to exclude the result that the identical terminal belongs to a plurality of the access points, which is contradictory, and to grasp a more accurate connection relation. The reason is that, also in a case where information such that the identical terminal has a connection with a plurality of the APs has been recorded, the AP group identifier acquired from the above terminal bears an AP group identifier of one AP at any time because the AP group identifier is information peculiar to each AP.

EMBODIMENT 4

The monitor apparatus in accordance with the present invention, as apparent from the above explanation, can be configured with hardware; however it is also possible to realize it with a computer program.

Figure 10:
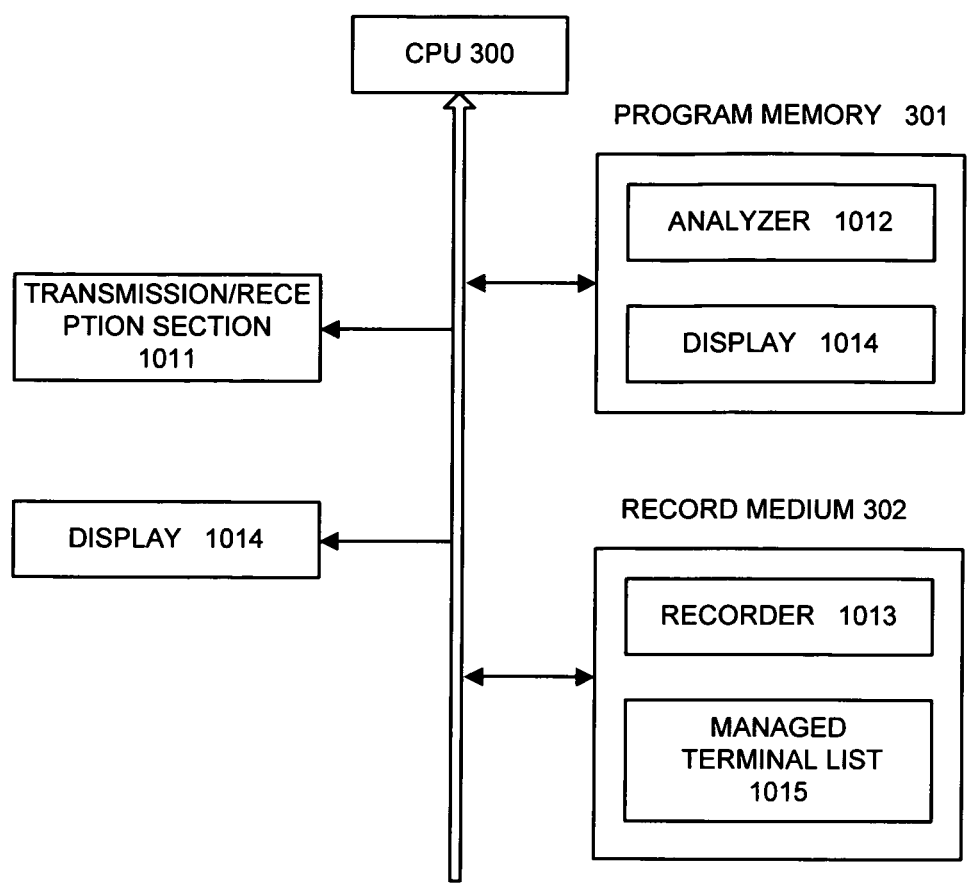
FIG. 10 is a block configuration diagram in an embodiment 4 of the present invention.

FIG. 10 is a general block configuration diagram of the information processing apparatus having the monitor apparatus in accordance with the present invention implemented.

The information processing apparatus shown in FIG. 10 is comprised of a processor 300, a program memory 301, and a record medium 302.

In the program memory 301, the foregoing analyzer 1012 and the control program acting for one part of the display 1014 are filed, and the processor 300 carries out the foregoing action based upon this control program.

Further, in the record medium 302, the details to be recorded in the recorder 1013 and the managed terminal list 1015 are filed. Additionally, a magnetic storage medium such as a hard disc can be employed for the record medium 302.

As mentioned above, the present invention is applicable to an operation/administration system of the wireless LAN and a management server.

Additionally, in order to clarify a connection relation based upon the packet transfer information, applying the present invention to not only the wireless LAN but also the wireless network in which the connection situation of the terminal is difficult to grasp allows the connection situation between the wireless base station (the AP in the wireless LAN) and the terminal to be grasped.

Further, the present invention is also applicable to a network load distribution controller and an unjust-access detector that become one part of the operation system. The reason is that the present invention makes it possible to grasp the number of the terminal that is connected to each AP, to estimate the network load to each AP at a high precision, further, to acquire from each AP information associated with the terminal, which has transmitted/received the packet, out of the not-authenticated terminals, and to keep the record of the connection.

The invention claimed is:

1. A monitor apparatus of a wireless network connected to an access point of the wireless network via a network, said access point retaining packet transfer information including information of a correspondence between a port of said access point and an interface of said port, and information of a correspondence between an address of a transfer destination and the port, said monitor apparatus comprising:
    a managed terminal list having addresses of pre-registered end-user devices, said pre-registered end-user devices being targets of management,
    said pre-registered end-user devices being stored on the managed terminal list, as a subordinate to said access point when the authentication with said access point succeeds and said pre-registered end-user devices being stored on the managed terminal list as a subordinate to said access point when the authentication with said access point fails,
    where the access point and the end-user devices are separate and independent devices;
    a means configured to receive said packet transfer information from said access point, to detect a port bound to a wireless interface, said wireless interface being the port of the access point, from said packet transfer information, and to extract an address of a transfer destination corresponding to said detected port;
    an estimating means for estimating that a terminal corresponding to an address registered in said managed terminal list, said address coinciding with said extracted address, exists as a subordinate of the access point retaining said received packet transfer information, when the terminal succeeds in authentication with said access point; and
    an estimating means for estimating that a terminal corresponding to an address registered in said managed terminal list, said address coinciding with said extracted address, exists as a subordinate of the access point retaining said received packet transfer information, when the terminal fails in authentication with said access point.

2. A monitor apparatus of a wireless network connected to an access point of wireless network via a network, said monitor apparatus comprising: a managed terminal list having addresses of terminals pre-registered end-user devices, said pre-registered end-user devices being targets of management,
    said pre-registered end-user devices being stored on the managed terminal list as a subordinate to said access point when the authentication with said access point succeeds and said pre-registered end-user devices being stored on the managed terminal list as a subordinate to said access point when the authentication with said access point fails,
    where the access point and the end-user devices are separate and independent devices;
    a means configured to receive said packet transfer information from said access point, to detect a port bound to a wireless interface, said wireless interface being the port of the access point, from said packet transfer information, and to extract an address of a transfer destination corresponding to said detected port;

a determining means for investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation, when said terminal succeeds in authentication with said access point; and a determining means for investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation when said terminal fails in authentication with the access point.

3. The monitor apparatus of a wireless network according to claim 2, further comprising:

a determining means for comparing said extracted address with an address described in said managed terminal list, and for, in a case where said extracted address is not included in said managed terminal list, determining that an access to the access point retaining said packet transfer information has been made by a terminal that is not a target of management.

4. The monitor apparatus of a wireless network according to claim 2, further comprising:

a means for drawing a result on a relation between an access point and terminals, which are estimated to be existent as subordinates of said access point, or are determined to the in connection with said access point, for all the access points under management thereof to display a relation between each access point and each terminal that is estimated to be existent as a subordinate of each access point, or each terminal that is determined to be in connection with each access point.

5. The monitor apparatus of a wireless network according to claim 2, wherein, in a case where the address of the identical terminal has been described in said packet transfer information retained by plural access points, including:

a means for, from among said packet transfer information, selecting the packet transfer information retained by the access point belonging to an identical subnet to that of said terminal, or the access point corresponding to a virtual LAN; and a means for, in a case where said selected packet transfer information retained by the access point belongs to the identical subnet to that of said terminal, and yet the number thereof is only one, estimating that said terminal exists as a subordinate of said one access point, or determines that said terminal has a connection with its access point, for, in a case where said access point belongs to the identical subnet to that of said terminal, and yet the number thereof is plural, estimating that said terminal exists as a subordinate of one of said plurality of said access points, or determines that said terminal has a connection with its access point, and for, in a case where all said access points do not belong to the identical subnet to that of said terminal, and yet each thereof is an access point corresponding to a virtual LAN, estimating that said terminal exists as a subordinate of one of said access points corresponding to said virtual LAN, or determines that said terminal has a connection with to its access point.

6. The monitor apparatus of a wireless network according to claim 2, wherein, in a case where the address of the identical terminal has been described in said packet transfer information retained by plural access points, including:

a means for, from said terminal, acquiring identification information of the wireless network to which said terminal belongs;

a means for comparing identification information of said plural access points with the identification information acquired from said terminal; and a means for estimating that said terminal exists as a subordinate of the access point having the identification information identical to the identification information acquired from said terminal, or determining that said terminal has a connection with its access point.

7. A monitor system of a wireless network, said monitor system comprising:

at least one access point of a wireless network, said at least one access point retaining packet transfer information including information of a correspondence between a port of said at least one access point and an interface of said port, and information of a correspondence between an address of a transfer destination and the port;

at least one terminal of the wireless network; and a monitor apparatus connected to said at least one access point via a network, wherein said monitor apparatus comprises:

a managed terminal list having addresses of pre-registered end-user devices, said pre-registered end-user devices being targets of management, said pre-registered end-user devices being stored on the managed terminal list, as a subordinate to said access point when the authentication with said access point succeeds and said pre-registered end-user devices being stored on the managed terminal list as a subordinate to said access point when the authentication with said access point fails, where the access point and the end-user devices are separate and independent devices;

a means configured to receive said packet transfer information from said at least one access point, to detect a port bound to a wireless interface, said wireless interface being the port of the at least one access point, from said packet transfer information, and to extract an address of a transfer destination corresponding to said detected port;

an estimating means for estimating that a terminal corresponding to an address registered in said managed terminal list, said address coinciding with said extracted address, exists as a subordinate of the access point retaining said received packet transfer information, when the terminal succeeds in authentication with said access point; and an estimating means for estimating that a terminal corresponding to an address registered in said managed terminal list, said address coinciding with said extracted address, exists as a subordinate of the access point retaining said received packet transfer information, when the terminal fails in authentication with said access point.

8. A monitor system of a wireless network, said monitor system comprising:

at least one access point of the wireless network;

at least one terminal of the wireless network; and a monitor apparatus connected to said access point via a network, wherein said monitor apparatus comprises:

a managed terminal list having addresses of pre-registered end-user devices, said pre-registered end-user devices being targets of management, said pre-registered end-user devices being stored on the managed terminal list, as a subordinate to said access point when the authentication with said access point succeeds and said pre-registered end-user devices being stored on the managed terminal list as a subordinate to said access point when the authentication with said access point fails, where the access point and the end-user devices are separate and independent devices;

a means configured to receive said packet transfer information from said at least one access point, to detect a port bound to a wireless interface, said interface being the port of the at least one access point, from said packet transfer information, and to extract an address of a transfer destination corresponding to said detected port;

a determining means for investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation, when said terminal succeeds in authentication with said access point; and a determining means for investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation when said terminal fails in authentication with the access point.

9. The monitor system of a wireless network according to claim 8, wherein said monitor apparatus further comprises:

a determining means for comparing said extracted address with an address described in said managed terminal list to determine that an access to the access point retaining said packet transfer information has been made by a terminal that is not a target of management in a case where said extracted address is not included in said managed terminal list.

10. The monitor system of a wireless network according to claim 8, wherein said monitor apparatus further comprises:

a means for drawing a result on a relation between an access point and terminals, which are estimated to be existent as subordinates thereof, or are determined to be in connection with said access point, for all access points under management thereof to display a relation between each access point and each terminal that is estimated to be existent as a subordinate of each access point, or each terminal that is determined to be in connection with each access point.

11. The monitor system of a wireless network according to claim 8, wherein, in a case where the address of the identical terminal has been described in said packet transfer information retained by plural access points, said monitor apparatus includes:

a means for, from among said packet transfer information, selecting the packet transfer information retained by the access point belonging to an identical subnet to that of said terminal, or the access point corresponding to a virtual LAN; and a means for, in a case where said selected packet transfer information retained by the access point belongs to the identical subnet to that of said terminal, and yet the number thereof is only one, estimating that said terminal exists as a subordinate of said one access point, or determining that said terminal has a connection with its access point, for, in a case where said access point belongs to the identical subnet to that of said terminal, and yet the number thereof is plural, estimating that said terminal exists as a subordinate of one of said plurality of said access points, or determining that said terminal has a connection with its access point, and for, in a case where all the access points do not belong to the identical subnet to that of said terminal, and yet each thereof is an access point corresponding to a virtual LAN, estimating that said terminal exists as a subordinate of one of said access points corresponding to said virtual LAN, or determining that said terminal has a connection with its access point.

12. The monitor system of a wireless network according to claim 8, wherein, in a case where the address of the identical terminal has been described in said packet transfer information retained by plural access points, said monitor apparatus includes:

a means for, from said terminal, acquiring identification information of the wireless network to which said terminal belongs;

a means for comparing identification information of said plural access points with the identification information acquired from said terminal; and a means for estimating that said terminal exists as a subordinate of the access point having identification information identical to the identification information acquired from said terminal, or determining that said terminal has a connection with its access point.

13. The monitor system of a wireless network according to claim 8, wherein:

said terminal includes a means for transmitting a broadcast packet; and said access point includes a means for updating the packet transfer information that the access point retains based upon said broadcast packet.

14. The monitor system of a wireless network according to claim 8, wherein said access point further comprises:

a means for notifying to the other access point information as to which access point to which the terminal belongs; and a means for updating the packet transfer information that the access point retains based upon said information as to which access point to which said terminal belongs.

15. A control program embodied on a non-transitory memory that when executed causes a device to perform operations comprising:

storing a managed terminal list having addresses of pre-registered end-user devices, said pre-registered end-user devices being targets of management, said pre-registered end-user devices being stored on the managed terminal list as a subordinate to said access point when the authentication with said access point succeeds and said pre-registered end-user devices being stored on the managed terminal list as a subordinate to said access point when the authentication with said access point fails, where the access point and the end-user devices are separate and independent devices;

receiving packet transfer information from an access point;

detecting a port bound to a wireless interface from said packet transfer information, said wireless interface being the port of the access point, extracting an address of a transfer destination corresponding to said detected port;

estimating that a terminal corresponding to an address registered in a managed terminal list, said address coincides with said extracted address, exists as a subordinate of the access point retaining said packet transfer information, when the terminal succeeds in authentication with said access point; and estimating that a terminal corresponding to an address registered in said managed terminal list, said address coinciding with said extracted address, exists as a subordinate of the access point retaining said received packet transfer information, when the terminal fails in authentication with said access point.

16. A control program embodied on a non-transitory memory that when executed causes a device to perform operations comprising:

storing a managed terminal list having addresses of pre-registered end-user devices, said pre-registered end-user devices being targets of management, said pre-registered end-user devices being stored on the managed terminal list as a subordinate to said access point when the authentication with said access point succeeds and said pre-registered end-user devices being stored on the managed terminal list as a subordinate to said access point when the authentication with said access point fails, where the access point and the end-user devices are separate and independent devices;

receiving packet transfer information from an access point;

detecting a port bound to a wireless interface from said packet transfer information, said wireless interface being the port of the access point;

extracting an address of a transfer destination corresponding to said detected port;

investigating an operation situation of a terminal corresponding to an address registered in a managed list, said list address coinciding with said extracted address to determine that said terminal having said extracted address has a connection with the access point retaining said received packet transfer information in a case where said terminal having said address is in operation, when said terminal succeeds in authentication with said access point; and investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation when said terminal fails in authentication with the access point.

17. The control program according to claim 16, wherein the operations further comprise comparing said extracted address with an address described in said managed terminal list to determine that an access to the access point retaining said packet transfer information has been made by a terminal that is not a target of management in a case where said extracted address is not included in said managed terminal list.

18. The control program according to claim 16, wherein the operations further comprise drawing a result on a relation between an access point and terminals, which are estimated to be existent as subordinates of said access point, or are determined to be in connection with said access point, for all the access points under management thereof to display a relation between each access point and each terminal that is estimated to be existent as a subordinate of each access point, or each terminal that is determined to be in connection with each access point.

19. The control program according to claim 16, wherein the operations further comprise:

from among said packet transfer information, selecting the packet transfer information retained by the access point belonging to the identical subnet to that of said terminal, or the access point corresponding to a virtual LAN; and in a case where said selected packet transfer information retained by the access point belongs to the identical subnet to that of said terminal, and yet the number thereof is only one, estimating that said terminal exists as a subordinate of said one access point, or determining that said terminal has a connection with its access point, for, in a case where said access point belongs to the identical subnet to that of said terminal, and yet the number thereof is plural, estimating that said terminal exists as a subordinate of one of said plurality of said access points, or determining that said terminal has a connection with its access point, and for, in a case where all the access points do not belong to the identical subnet to that of said terminal, and yet each thereof is an access point corresponding to a virtual LAN, estimating that said terminal exists as a subordinate of one of said access points corresponding to said virtual LAN, or determining that said terminal has a connection with its access point.

20. The control program according to claim 16, wherein the operations further comprise:

acquiring identification information of the wireless network to which the terminal belongs;

comparing identification information of said plural access points with the identification information acquired from said terminal; and estimating that said terminal exists as a subordinate of the access point having the identification information identical to the identification information acquired from said terminal, or determining that said terminal has a connection with its access point.

21. A monitor method of a wireless network for managing a terminal, comprising:

storing a managed terminal list having addresses of pre-registered end-user devices, said pre-registered end-user devices being targets of management, said pre-registered end-user devices being stored on the managed terminal list, as a subordinate to said access point when the authentication with said access point succeeds and said pre-registered end-user devices being stored on the managed terminal list as a subordinate to said access point when the authentication with said access point fails, where the access point and the end-user devices are separate and independent devices;

receiving packet transfer information from an access point;

detecting a port bound to a wireless interface from said packet transfer information, said wireless interface being the port of the access point;

extracting an address of a transfer destination corresponding to said detected port;

estimating that a terminal corresponding to an address registered in said managed terminal list, said address coinciding with said extracted address, exists as a subordinate of the access point retaining said received packet transfer information, when the terminal succeeds in authentication with said access point; and estimating that a terminal corresponding to an address registered in said managed terminal list, said address coinciding with said extracted address, exists as a subordinate of the access point retaining said received packet transfer information, when the terminal fails in authentication with said access point.

22. A monitor method of a wireless network for managing a terminal, comprising:

storing a managed terminal list having addresses of pre-registered end-user devices, said pre-registered end-user devices being targets of management, said pre-registered end-user devices being stored on the managed terminal list as a subordinate to said access point when the authentication with said access point succeeds and said pre-registered end-user devices being stored on the managed terminal list as a subordinate to said access point when the authentication with said access point fails, where the access point and the end-user devices are separate and independent devices;

receiving packet transfer information from an access point;

detecting a port bound to a wireless interface from said packet transfer information, said wireless interface being the port of the access point;

extracting an address of a transfer destination corresponding to said detect port;

investigating an operation situation of a terminal corresponding to an address registered in said managed list, said list addresses coinciding with said extracted address, to determine if said terminal having said extracted address has a connection with the access point retaining said received packet transfer information in a case where said terminal having said address is in operation, when said terminal succeeds in authentication with said access point; and investigating an operation situation of a terminal corresponding to an address registered in said managed list, said list address coinciding with said extracted address, to determine that said terminal having said extracted address has a connection with the access point retaining said received packet transfer information in a case where said terminal having said address is in operation when said terminal fails in authentication with the access point.

23. The monitor method of a wireless network according to claim 22, further comprising:

comparing said extracted address with an address described in said managed terminal list to determine that an access to the access point retaining said packet transfer information has been made by a terminal that is not a target of management in a case where said extracted address is not included in said managed terminal list.

24. The monitor method of a wireless network according to claim 22, further comprising:

drawing a result on a relation between an access point and terminals, which are estimated to be existent as subordinates of said access point, or are determined to be in connection with said access point, for all the access points under management thereof to display a relation between each access point and each terminal that is estimated to be existent as a subordinate of each access point, or each terminal that is determined to be, in connection with each access point.

25. The monitor method of a wireless network according to claim 22, wherein, in a case where the address of the identical terminal has been described in said packet transfer information retained by plural access points, including:

a step of, from among said packet transfer information, selecting the packet transfer information retained by the access point belonging to the identical subnet to that of said terminal, or the access point corresponding to a virtual LAN; and a step of, in a case where said selected packet transfer information retained by the access point belongs to the identical subnet to, that of said terminal, and yet the number thereof is only one, estimating that said terminal exists as a subordinate of said one access point, or determining that said terminal has a connection with its access point, of, in a case where said access point belongs to the identical subnet to that of said terminal, and yet the number thereof is plural, estimating that said terminal exists as a subordinate of one of said plurality of said access points, or determining that said terminal has a connection with its access point, and of in a case where all the access points do not belong to the identical subnet to that of said terminal, and yet each thereof is an access point corresponding to a virtual LAN, estimating that said terminal exists as a subordinate of one of the access points corresponding to said virtual LAN, or determining that said terminal has a connection with its access point.

26. The monitor method of a wireless network according to claim 22, wherein, in a case where the address of the identical terminal has been described said packet transfer information retained by plural access point, including:

a step of from said terminal, acquiring identification information of the wireless network to which said terminal belongs;

a step of comparing identification information of said plural access points with the identification information acquired from said terminal; and a step of estimating that said terminal exists as a subordinate of the access point having the identification information identical to the identification information acquired from said terminal, or determining, that said terminal has a connection with its access point.

* * * * *

UNITED STATES PATENT AND TRADEMARK OFFICE
CERTIFICATE OF CORRECTION

PATENT NO.        : 8,639,217 B2
APPLICATION NO.   : 10/588456
DATED             : January 28, 2014
INVENTOR(S)       : Koichi Ebata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this
Twenty-second Day of September, 2015

Michelle K. Lee
*Director of the United States Patent and Trademark Office*